United States Patent [19]

Dickensheets et al.

[11] 3,713,563
[45] Jan. 30, 1973

[54] PIECE PART SUPPLY MECHANISM
[75] Inventors: Carlton O. Dickensheets; James G. Steizer, both of Dayton, Ohio
[73] Assignee: The Globe Tool and Engineering Company, Dayton, Ohio
[22] Filed: March 30, 1971
[21] Appl. No.: 129,351

[52] U.S. Cl. ................................................ 221/205
[51] Int. Cl. ............................................... B65h 3/62
[58] Field of Search .............. 221/168, 183, 200–205

[56] References Cited

UNITED STATES PATENTS

| 3,082,908 | 3/1963 | Ingham | 221/183 X |
| 439,030 | 10/1890 | Dieterich | 221/204 X |

Primary Examiner—Robert B. Reeves
Assistant Examiner—Thomas E. Kocovsky
Attorney—Dybvig & Dybvig

[57] ABSTRACT

Piece parts are permitted to descend under their own weight down an inclined surface of a supply hopper to a discharge opening. To prevent clogging of the opening, a sweeper blade is cyclically passed over the opening to break up piece part accumulation at the opening. Piece parts passing the discharge opening enter a discharge chute which guides the piece parts in seriatum to an ejection station. Power delivered to the ejection station also cycles the sweeper blade to synchronize sweeper blade operation with the demand for piece parts. Bias means associated with the sweeper blade mounting yield to prevent damage to piece parts should the sweeper blade become jammed against piece parts.

8 Claims, 3 Drawing Figures

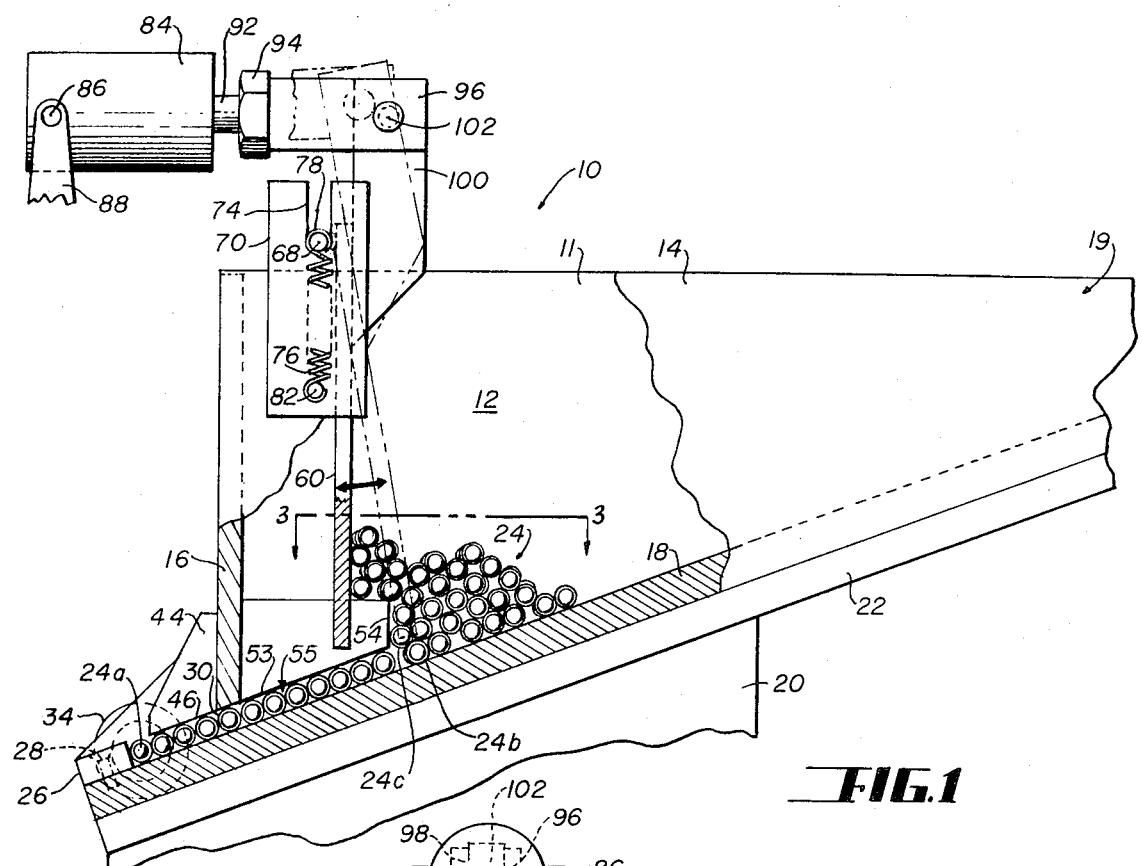
FIG.1
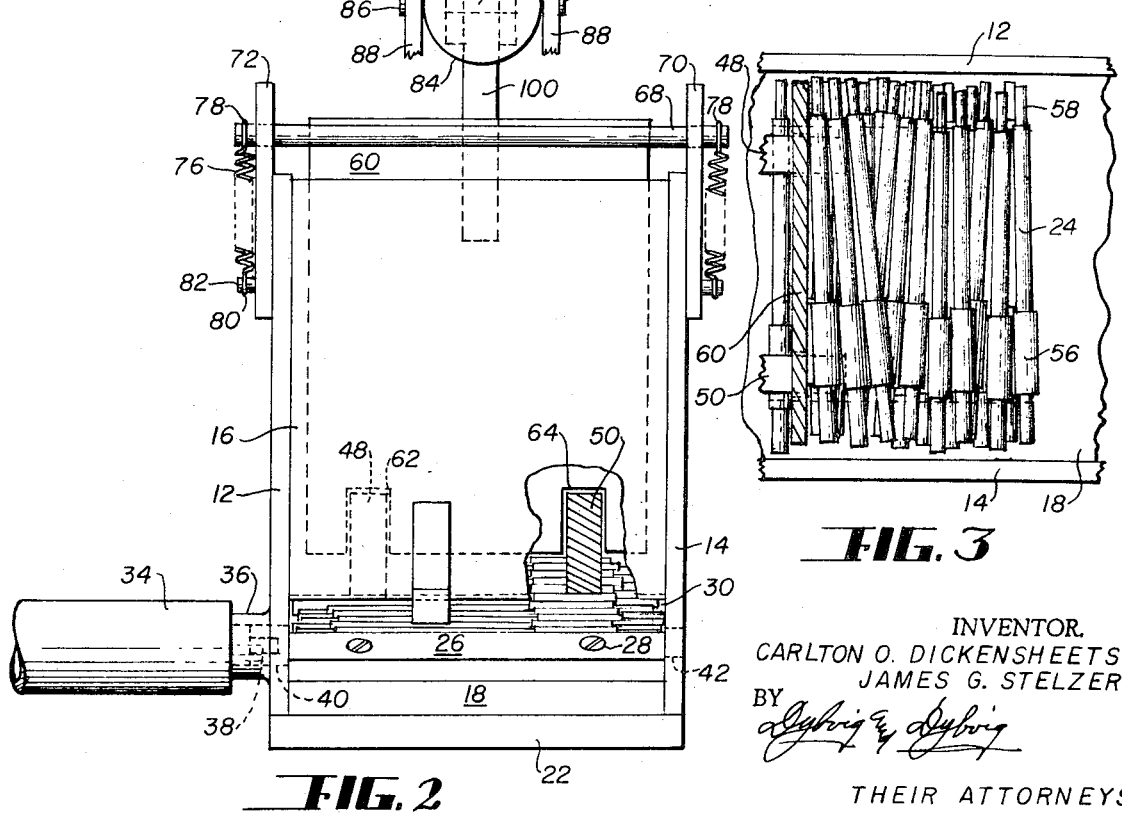
FIG.2
FIG.3
INVENTOR.
CARLTON O. DICKENSHEETS
JAMES G. STELZER
BY
Dybvig & Dybvig
THEIR ATTORNEYS

PIECE PART SUPPLY MECHANISM

BACKGROUND OF THE INVENTION

1. Field of the Invention

This invention relates to a jogging mechanism for assisting the orderly discharge of piece parts from a supply hopper. More particularly, the invention relates to a mechanism to break up jams of piece parts which are permitted to roll under the influence of gravity in a gravity-fed hopper.

2. Description of the Prior Art

In the type of hopper mechanism to which the present invention relates, piece parts accumulated in the hopper are permitted to slide or roll toward an opening allowing discharge from the hopper. Piece parts are removed from the discharge opening at a rate determined by the operation of peripheral equipment and more particularly by a rate determined by the demand for the piece parts. A problem is that the rolling or sliding movement of piece parts toward the hopper discharge opening sometimes results in the parts tumbling one over the other in irregular patterns which sometimes jam the discharge opening. In the prior art, one expedient has been to assign an employee the responsibility of attending the hopper and the job of manually correcting or removing piece part jams that may occur within the hopper. Another prior art technique has been to periodically or continuously vibrate or shake the entire hopper thus allowing jammed piece parts to shake loose from their jammed condition.

SUMMARY OF THE PRESENT INVENTION

In its preferred embodiment, the present invention is concerned with piece parts in the form of elongated shafts. There is ordinarily no problem in so introducing shafts to a hopper that the shafts will assume a parallel position and are properly oriented for a transfer out of the hopper to peripheral equipment. There is a problem, however, in that, within a hopper, the shafts will tend to assemble in nested layers in which the shafts of each upper layer tend to nest in the crevices between adjacent shafts of the immediately lower layer. At the hopper's discharge opening, the upper layers of shafts in the hopper, due to their nested relationship with lower layers, tend to block or retard the discharge of shafts from the lower layers of the hopper.

To assure a complete discharge of all shafts within the hopper, the discharge opening is designed to accept only those shafts which reach the lowermost layer of the hopper. However, since upper layers tend to retard lower layers for the reasons given, a tendency of the shafts to jam at the hopper's discharge opening becomes the rule rather than the exception.

In the present invention, it has been discovered that jams of the nature described can be broken in a simple and reliable manner by pushing the upper layers of shafts rearwardly over the lowermost layers.

The pushing action is accomplished by means of a sweeper blade against which surplus shafts within the hopper are permitted to accumulate.

A part of the peripheral equipment for the preferred embodiment of this invention is a shaft ejector mechanism which is periodically operated in accordance with the demand for shafts to eject shafts one at a time from the hopper mechanism. To assure a continuous availability of shafts as needed, the power supplied to the ejector mechanism is coupled with the power supply to the aforementioned pushing mechanism with the result that each time the ejector mechanism is operated the pusher mechanism also operates to assure that the discharge of shafts from the hopper is always at least sufficient to supply the demands of the ejector mechanism.

While the sweeper blade action described above can be highly reliable for regularly shaped shafts, shafts having irregular diameters along their length can sometimes jam together in such a fashion as to block even the sweeper blade. To avoid damage to the shafts and also to the sweeper blade operating mechanism should jams of this nature occur, the present invention also includes a releasable mounting for the sweeper blade and its operating mechanism which is so arranged to permit the sweeper blade to move over jams which positively block the normal and intended motion of the sweeper blade.

One object of the present invention is to provide a new and improved mechanism for jogging accumulated piece parts.

Another object of the present invention is to provide a new and improved hopper mechanism for supplying rollable piece parts to a discharge position.

A further object of the present invention is to provide a releasable operating mechanism suitable for actuating a jogging blade.

Other objects and advantages reside in the construction of parts, the combination thereof, the method of manufacture and the mode of operation, as will become more apparent from the following description.

BRIEF DESCRIPTION OF THE DRAWING

FIG. 1 is a fragmentary side elevation view with portions broken away illustrating a hopper mechanism embodying the present invention.

FIG. 2 is a fragmentary end elevation view of the structure shown in FIG. 1 with a portion broken away to reveal interior details.

FIG. 3 is a fragmentary section view taken substantially along the line 3—3 of FIG. 1.

DESCRIPTION OF THE PREFERRED EMBODIMENT

The drawing illustrates a piece part supply mechanism 10 which comprises a hopper 11 having side walls 12 and 14, a forward wall 16, and a ramp or floor 18 leading from a rearward entrance 19, not shown in detail. A pedestal 20 having an inclined support surface 22 supports the hopper in a spatial attitude in which the ramp 18 is inclined to the horizontal such that objects placed on the ramp will tend to slide or roll under their own weight forwardly and downwardly toward the wall 16. The side walls 12 and 14 are disposed parallel to the direction in which objects will tend to slide or roll and thus guide the movements of objects placed on the ramp 18.

Designated generally by the reference number 24 are piece parts of a type suitable for it is and handling by the supply mechanism 10. As best appears in FIG. 3, the piece parts 24 are shafts which have been machined so as to have different diameters at different distances along the length thereof. For the purpose of illustrating the present invention, the piece parts are shown as having an intermediate portion 56 of largest diameter and an end portion 58 of smallest diameter. Obviously, if such a part is permitted to roll freely on a flat, horizontal surface, the part will tend to roll through a circular trajectory since the larger portion 56 will advance a greater distance with each revolution than will the smaller portion 58. This tendency toward a circular rolling trajectory introduces one of the problems solved by the present invention. While the piece parts 24 are illustrated as having a particular shape, this being a shape that readily reveals certain problems solved by the present invention, is to be understood that the present invention is not limited to any particular shape of piece part and thus is applicable to a vast range of piece part sizes and shapes.

The particular means by which the piece parts reach the hopper 11 is unimportant. It is nevertheless desirable that the piece parts reach the ramp 18 with an end-to-end orientation which is always the same. Thus, as appears in FIG. 3, the larger portions 56 of the piece parts are uniformly proximal to the wall 14 and distal from the wall 12. Of course, if the piece parts are right cylinders and thus have no end-to-end irregularities, the end-to-end orientation of the piece parts is unimportant.

In accordance with the present invention, the piece parts 24 are permitted to roll or slide forwardly and downwardly along the ramp 18 and under a gap 30 at the base of the wall 16 to rest against an abutment 26 fixedly positioned on the ramp 18 by screws 28. In FIG. 1 a particular piece part designated 24a is shown at this position. Additional piece parts arriving on the ramp 18 accumulate behind the piece part 24a as shown in FIG. 1. The accumulated piece parts are ejected one by one from the hopper by an actuator 34 mounted to the outside of the wall 12 by a supporting tube 36 welded to the wall 12. The actuator 34 may be an air-operated actuator having a plunger 38 which, upon actuation thereof, is advanced from left to right as appears in FIG. 2 through an aperture 40 in the wall 12 and laterally adjacent the abutment 26 a suitable distance toward the wall 14. The supporting tube 36 so positions the actuator 34 that the plunger 38 will act against only the single part 24a illustrated in FIG. 1, the part being ejected through an aperture 42 in the wall 14. Such a mode of ejection may be employed to eject piece parts directly to a machine, not shown, which will utilize the parts in a subsequent manufacturing operation. The ejection may be a partial ejection completed by the receiving machine or it may be a total ejection as the result of which the part falls to or is conveyed to the receiving machine.

In order to allow an ample supply of piece parts 24 that can be reliably discharged one at a time as the demand may arise, a guide member 44 having a guiding surface 46 is welded to the outer face of the wall 16 and guide members 48 and 50 having guiding surfaces 53 are welded to the interior surface of the wall 16. The guide members 44, 48 and 50 cooperate with the ramp 18 to define a chute 55 in which a single layer of the piece parts 24 can accumulate without the possibility that some piece parts will roll over other piece parts.

In the terminology being used to describe the present invention, those piece parts 24 which are to the right of the innermost surfaces 54 of the guide members 48 and 50 and those piece parts which have accumulated above the guide members 48 and 50 as they appear in FIG. 1 are piece parts located within the hopper 11. Those piece parts which have entered the chute 55 are piece parts which have exited from the hopper 11 so as to enter a discharge section including the chute 55. The gap between the lower edges of the surfaces 54 and the ramp 18 is thus a discharge opening from the hopper 11. As above noted, piece parts which have passed the discharge opening and thus are located in the chute 55 cannot become jammed by tumbling one against the other. On the other hand, piece parts remaining in the hopper 11 are in an environment in which the piece parts can tumble one over the other, thus forming nested layers of piece parts, each of the nested layers occupying a plane generally parallel to the ramp 18. FIGS. 1 and 3 merely illustrate random accumulations of piece parts, and as suggested in FIG. 3, some of the piece parts 24 may in fact lie athwart others of the piece parts.

Also as suggested in FIG. 1, a jamming condition can be expected to occur in which the particular part 24b in the lowermost layer of piece parts is nested between overlying piece parts in the next higher layer with one of the overlying piece parts 24c resting against the surfaces 54 of the guide members 48 and 50. Assuming, as shown in FIG. 1, that there are further overlying piece parts which collectively exert a weight downwardly against the part 24b, there is no realistic hope that the jammed condition will break up naturally, upon the addition of further piece parts to the hopper 11. The present invention provides a means, however, by which jams of this nature are routinely broken without the need for manual assistance.

Welded to the upper and outer surfaces of the side walls 12 and 14 are journal plates 70 and 72 respectively which have vertically disposed slots 74 therein. The slots 74 are sized and shaped to slidably receive a shaft 68 to which is welded a sweeper blade 60. As evident in FIG. 2, the sweeper blade 60 depends from the shaft 68 at a centralized location between the side walls 12 and 14 and occupies most of the space between the side walls. Cutouts or notches 62 and 64 entering the lowermost edge of the blade 60 are sized to receive the guide members 48 and 50 respectively with a sufficient clearance that the sweeper blade 60 can swing freely above the guide members 48 and 50 and project downwardly between the guide members and the side walls 12 and 14. The shaft 68 is biased downwardly in the slots 74 by means of springs 76, there being one spring at each end of the shaft 68. Each of the springs 76 has an upper end 78 hooked about the shaft 68 and a lower end 80 hooked about a stub shaft 82 fixedly secured to one of the journal plates 70 and 72. The springs 76 cooperate to bias the shaft 68 to the lower limit of shaft movement afforded by the slots 74.

An actuator for the sweeper blade designated by the reference number 84 has axially aligned stub shafts 86 affixed to its housing and journalled in suitable supporting arms 88. The arms 88 are a part of any suitable support structure which is stationary with respect to the hopper 11. The stub shafts 86 allow free rotation of the actuator 84 between the support arms 88.

The actuator 84 drives a plunger 92 having an enlarged nut 94 threaded thereon. Welded to the nut 94 are parallel plates 96 and 98 which define a clevis for pivotally receiving a plate 100. The pivotal axis for the plate 100 is fixed by means of a pin 102 passing through the two clevis plates 96 and 98 and through the plate 100. The plate 100 has one of its side margins welded to the sweeper blade 60.

The actuator 84 is a limited stroke actuator so connected with reference to the actuator 34 that the two actuators operate simultaneously. It was previously indicated that the actuator 34 is an air-operated actuator and accordingly the actuator 84 is also preferred to be an air-operated actuator, the two actuators 34 and 84 being operated from a single air supply having a control valve (not shown) which is common to both actuators. Thus, at the same time the actuator 34 is operated to eject a piece part 24 from the hopper, the actuator 84 is operated to advance the sweeper blade to the dotted line position shown in FIG. 1. Similarly, at the same time the actuator 34 is returned after ejection of a piece part from the hopper, the actuator 84 is returned to place the sweeper blade 60 in the full line position illustrated in FIG. 1.

It will be noted that the movement of the sweeper blade 60 is through a relatively small arc from an initial position forward of the surfaces 54 of the guide members 48 and 50 to a position which is rearward of these surfaces but not so far rearward that there is room for any of the piece parts to move between the surfaces 54 and the sweeper blade 60.

For reasons to become more apparent in the following discussion, it is desirable that the sweeper blade 60 be so mounted that its lower edge never so closely approaches the ramp 18 that a piece part 24 will be clamped in the space between the sweeper blade and the ramp 18. Thus, the sweeper blade is so mounted that it can have no position which will impair rolling movement of any parts thereunder.

As clearly evident in FIG. 1, the solid line position of the sweeper blade 60 allows an accumulation of the piece parts 24 on a ledge formed by the upper surfaces of the guide members 48 and 50. This feature serves to relieve the initial load against the sweeper blade 60 when the actuator 84 is initially energized to move the sweeper blade 60 to the dotted line position. Thus, if the sweeper blade 60 were mounted at an initial position coplanar with the surfaces 54 of the guide members 48 and 50, and the hopper 11 would be substantially filled with piece parts, it would be necessary for the sweeper blade 60 to receive enough power to overcome the rest inertia of all but the lowermost layer of piece parts in the hopper. By having the sweeper blade 60 set forward of the surfaces 54 in its initial position so that some of the parts can accumulate above the guide members 48 and 50, the initial work required of the sweeper blade in moving to the dotted line position is only that work required to move the upper layers of the accumulated piece parts. Once these upper layers are in motion, it requires relatively little continued effort by the actuator 84 to also move the lower layers as the sweeper blade 60 passes rearwardly of the surfaces 54. It has been found that as the piece parts 24 are moved rearwardly and upwardly of the ramp 18, upper layers of the piece parts tend to roll over lower layers. More particularly, the piece part 24c will tend to roll over the piece part 24b, thus freeing the part 24b for later entry to the chute 55.

When the sweeper blade 60 has reached the dotted line position and the actuator 84 is then extended to return the sweeper blade 60 to its solid line position, the piece part 24b is presented with a clear exit path to the chute 55, and the jam originally caused by the part 24c is thus broken.

Even where certain of the piece parts are athwart of others as indicated in FIG. 3, the relatively small movement of the sweeper blade 60 illustrated in FIG. 1 is found generally sufficient to correct the condition since the rolling of the piece parts caused by movement of the blade 60 encourages the parts to nest in a parallel relationship.

As explained in an earlier portion of this specification, piece parts having the general shape illustrated in FIG. 3 will tend to roll in a somewhat circular pattern and, depending upon the manner in which the piece parts are introduced into the hopper, the possibility exists that a piece part will roll around to a position in which its axis is parallel to the side walls 12 and 14. Should this occur, the piece part will ultimately jam the entrance to the chute 55 and a condition can occur in which the force required to move the sweeper blade 60 becomes so great that either the actuator 84 must fail or else damage to the sweeper blade or one or more of the piece parts 24 can be expected. In the present invention the possibility of such damage is considerably relieved because the springs 76 permit the sweeper blade to rise upwardly over such an obstruction. Of course, should such an obstruction occur, the sweeper blade will not cure the problem. Accordingly, it will be necessary to stop the automatic operation of the hopper mechanism and manually remove such an obstruction. It is important nevertheless that such obstructions can be encountered without damage by reason of the present invention to the sweeper mechanism or to piece parts being accumulated within the hopper.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. A supply mechanism for piece parts comprising, in combination, a ramp and walls forming a hopper, means supporting said hopper in an attitude at which said ramp is inclined to the horizontal whereby piece parts deposited in said hopper and on said ramp descend under their own weight from a rearward end toward a forward end of said ramp, guide means attached to said hopper and spaced above a forward portion of said ramp, said guide means cooperating with said forward portion of said ramp to define a discharge opening from said hopper, and said guide means extending forwardly from said discharge opening and cooperating with said ramp to define a discharge chute, jogging means comprising a sweeper blade, mounting means supporting said sweeper blade in said hopper above said ramp, and motive means to move said sweeper blade between first and second positions, said first position being forward of said discharge opening and said second position being rearward of said discharge opening.

2. The mechanism of claim 1 wherein said mounting means includes a shaft transverse to said ramp, said walls having journal means including vertically disposed slots in which said shaft is disposed for rotation, bias means to bias said shaft downwardly in said slots, said shaft being adapted to rise upwardly in said slots against the bias of said bias means upon said sweeper blade encountering obstruction to said forward or rearward movements.

3. A supply mechanism for piece parts comprising, in combination, an elongate ramp sloping downwardly along its length from a rearward receiving portion to a forward discharge portion, vertically disposed side walls flanking said ramp along its length, a guide member, means to support said guide member above a forward portion of said ramp, said guide member having a longitudinal extent between said side walls and having a lower surface disposed generally parallel to and confronting said ramp, said lower surface cooperating with said ramp to form a discharge chute having an entrance opening at the rearward end of said guide member, said guide member having an upper generally horizontal surface providing a ledge to receive piece parts thereon, a sweeper blade, means mounting said sweeper blade between said side walls for forward and rearward movements above said ramp and above said guide member, motive means to move said sweeper blade rearwardly and forwardly, said sweeper blade adapted to sweep piece parts rearwardly from said ledge of said guide member.

4. The mechanism of claim 3 in which said motive means is adapted to move said sweeper blade between a first position which is forward of said entrance opening and a second position which is rearward of said entrance opening.

5. The supply mechanism according to claim 4 wherein said guide member is spaced from one of said side walls, said sweeper blade having a portion projecting downwardly toward said ramp in the space between said guide member and said one side wall, said downwardly projecting portion having a lowermost edge confronting and spaced from said ramp.

6. The mechanism of claim 3 wherein said means mounting said sweeper blade includes a shaft disposed transverse to said ramp, said side walls having journal means rotatably supporting said shaft above said ramp, said sweeper blade fixed to and depending from said shaft.

7. The mechanism of claim 6 wherein said journal means include vertically disposed slots and including bias means to bias said shaft downwardly in said slots, said shaft adapted to rise upwardly in said slots against the bias of said bias means upon said sweeper blade encountering obstruction to its forward or rearward movements.

8. The mechanism of claim 7 wherein said motive means includes a cylinder and a plunger and means to move said plunger in said cylinder, clevis means attaching said sweeper blade to said plunger for rotation of said sweeper blade relative to said plunger about a first axis transverse to said side walls, and support means rotatably supporting said cylinder for rotation about a second axis spaced from and parallel to said first axis.

* * * * *